United States Patent
Sega et al.

(10) Patent No.: US 10,133,324 B2
(45) Date of Patent: Nov. 20, 2018

(54) THERMAL MITIGATION USER EXPERIENCE

(71) Applicant: Microsoft Technology Licensing, LLC, Redmond, WA (US)

(72) Inventors: Giorgio Francesco Sega, Kirkland, WA (US); Vincent Bellet, Redmond, WA (US); Elizabeth Fay Threlkeld, Duvall, WA (US); Darren Ray Davis, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 524 days.

(21) Appl. No.: 14/754,524

(22) Filed: Jun. 29, 2015

(65) Prior Publication Data

US 2016/0378150 A1 Dec. 29, 2016

(51) Int. Cl.
| | | |
|---|---|---|
| H01L 21/00 | (2006.01) | |
| H01L 31/058 | (2006.01) | |
| G06F 1/20 | (2006.01) | |
| G06F 11/30 | (2006.01) | |
| H04M 19/04 | (2006.01) | |

(52) U.S. Cl.
CPC .......... *G06F 1/206* (2013.01); *G06F 11/3017* (2013.01); *G06F 11/3058* (2013.01); *H04M 19/04* (2013.01); *Y02D 10/16* (2018.01)

(58) Field of Classification Search
CPC ................................................. H01J 2893/0027
USPC ...................................... 438/54, 14; 257/468
See application file for complete search history.

(56) References Cited

U.S. PATENT DOCUMENTS

| | | |
|---|---|---|
| 5,923,307 A | 7/1999 | Hogle, IV |
| 7,203,904 B2 | 4/2007 | Lee |
| 8,484,496 B2 * | 7/2013 | Anderson ............. H02J 7/0091 |
| | | 713/320 |
| 8,599,105 B2 | 12/2013 | Anttila et al. |
| 8,634,873 B2 | 1/2014 | Jones et al. |
| 8,872,731 B2 | 10/2014 | Gimpl et al. |
| 9,323,296 B2 * | 4/2016 | Ngai ........................ G06F 1/206 |
| 9,332,448 B2 * | 5/2016 | Montemurro ..... H04W 52/0216 |
| 2010/0330950 A1 | 12/2010 | Wells et al. |
| 2011/0006971 A1 | 1/2011 | Ebey et al. |
| 2011/0239142 A1 | 9/2011 | Steeves et al. |
| 2012/0084674 A1 | 4/2012 | Visosky |
| 2012/0272086 A1 | 10/2012 | Anderson et al. |
| 2014/0068520 A1 | 3/2014 | Missig et al. |
| 2014/0139567 A1 | 5/2014 | Jeon |
| 2014/0223490 A1 | 8/2014 | Pan et al. |

OTHER PUBLICATIONS

"International Preliminary Report on Patentability Issued in PCT Application No. PCT/US2016/039146", dated Sep. 19, 2017, 8 Pages.

(Continued)

*Primary Examiner* — Calvin Lee

(57) ABSTRACT

Examples described herein provide a thermal hardware mitigation experience for a computing device executing multiple applications. Thermal signals identifying thermal conditions for the device are processed and, based on those signals, a hardware mitigation user experience may be generated to prompt user interaction in order to mitigate a thermal hardware condition.

19 Claims, 6 Drawing Sheets

(56) References Cited

OTHER PUBLICATIONS

"International Search Report and Written Opinion Issued in PCT Application No. PCT/US2016/039146", dated Oct. 13, 2016, 12 Pages.

Bond, John-Michael, "Duet Display Turns Your Ios Device Into the Second Screen You've Always Wanted", Published on: Jan. 5, 2015, Available at: http://www.engadget.com/2015/01/05/duet-display-turns-your-ios-device-into-the-second-screen-youve/.

Buckley, Sean, "Sony Announces Playstation App for Ios and Android, Will Expand Games to the Second Screen", Published on: Feb. 20, 2013, Available at: http://www.engadget.com/2013/02/20/sony-announces-playstation-app-for-ios-android/.

"Mavericks", Retrieved on: Mar. 25, 2015, Available at: http://www.macrumors.com/roundup/os-x-mavericks/.

"Can I sleep one of the displays on a dual-monitor setup (running Windows 7)?", Published on: Aug. 23, 2011, Available at: http://superuser.com/questions/268521/can-i-sleep-one-of-the-displays-on-a-dual-monitor-setup-running-windows-7.

Wilson, Mark, "How to Use Your Tablet As a Second Monitor for Your Computer", Retrieved on: Mar. 25, 2015, Available at: http://www.androidpit.com/tablet-as-a-second-monitor.

"Second Written Opinion Issued in PCT Application No. PCT/US2016/039146", dated Jun. 19, 2017, 8 Pages.

\* cited by examiner

THERMAL MITIGATION USER EXPERIENCE

BACKGROUND

Applications running on computing devices consume power and cause computing devices to generate heat. When a computing device becomes too hot it may shut down to prevent damage, often without warning. Some systems provide a warning that device shut down is imminent, giving a user notice before the device becomes inactive.

SUMMARY

Examples of the disclosure provide a system for a thermal hardware mitigation experience. A user interface component receives thermal signals from an operating system component and generates a notification based on the thermal signals. The notification is output to a display and, based on user input received in response, at least one hardware mitigation action is performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
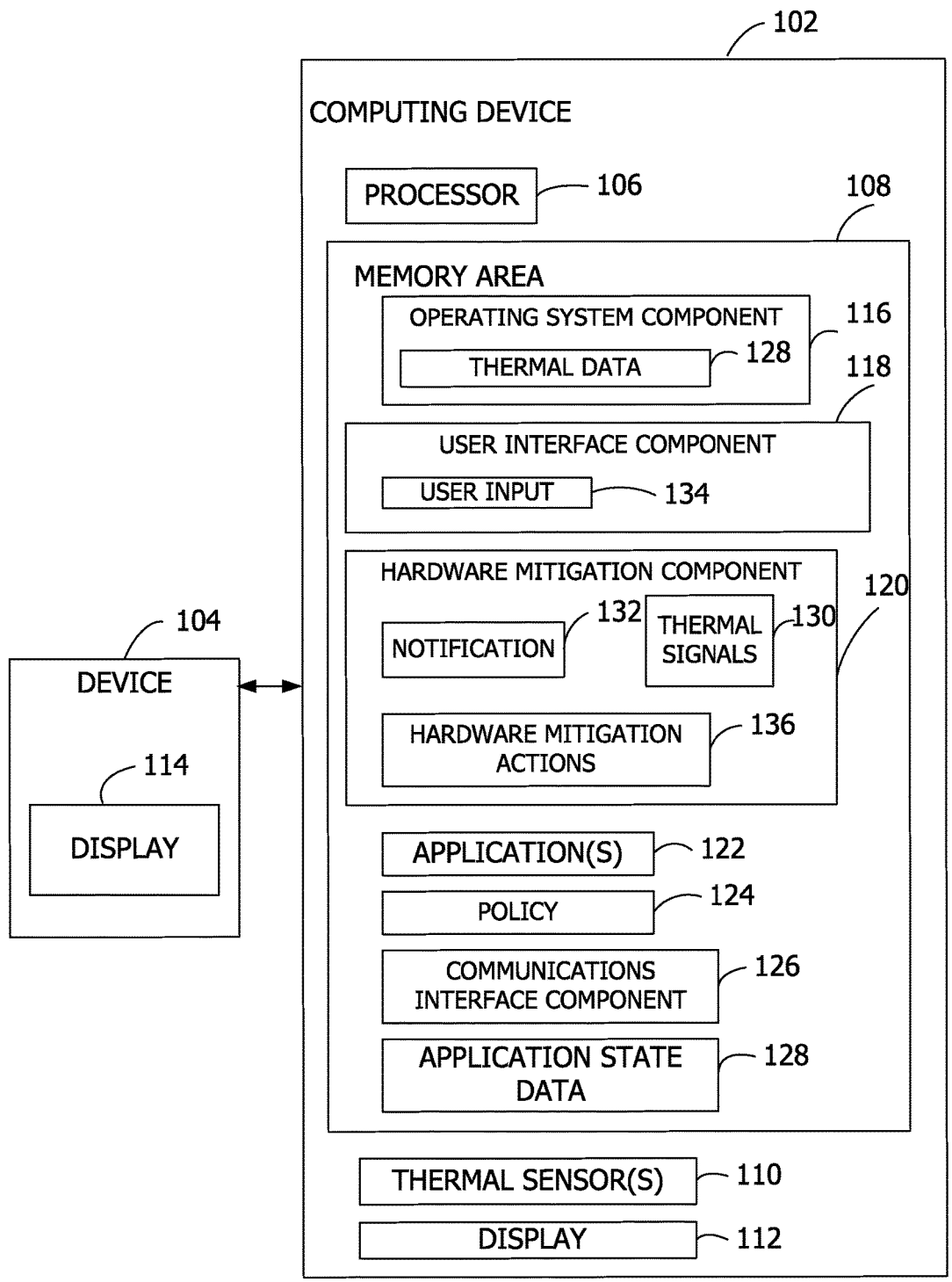
FIG. 1 is an exemplary block diagram illustrating a computing device for thermal hardware mitigation.

Referring to the figures, examples of the disclosure provide for a thermal hardware mitigation experience for a computing device operating in a disjoint mode. As described herein, disjoint mode refers to a computing device communicatively coupled to another device for the purpose of the computing device sending content to at least two displays at the same time, in which the content on each display is different. As described herein, each display in a disjoint mode experience may show different content, as opposed to a duplicate or mirrored mode where each display shows the same content. In these examples, a computing device in disjoint mode may stream or project content to one display that may appear to be separate or independent of content output on another display of a similarly connected device. Peripheral devices connected to the computing device, such as keyboard and mice, may also behave differently in a disjoint experience, providing a user experience in which it appears that each connected output device is operating in a quasi-independent fashion. Other connected devices may enable input directly associated with content displayed on that device to be routed back and managed by the computing device rendering the displayed content. In these examples, such a disjoint mode extends the user's experience to create an environment in which the computing device is behaving as if it is two independent devices. In some examples, establishment of a disjoint mode may occur based on a user command, a proximity distance between the computing device and the other device, a location trigger, or any other suitable trigger event. In some examples, a computing device operating in a disjoint mode receives signals related to thermal conditions of the computing device from the device operating system, and based on those signals may notify a user as part of a thermal hardware mitigation experience. Although exemplary illustrations provided herein describe a computing device in disjoint mode, aspects of the disclosure may also operate in a duplicate mode or extend mode, as well as a disjoint mode.

Aspects of the disclosure provide a computing device with the capability of having more than one active application in the foreground. In some examples, one or more active applications may be displayed on each screen, such as a mobile phone screen and a connected big screen. In other examples, an active application may have more than one view, with separate views displayed on the computing device display and the connected device display. In these examples, with more than one active application running in the foreground, even if displayed on different screens, these active applications are powered by the same hardware (e.g. a mobile phone), for example. In this illustrative scenario, temperatures may increase as the hardware powers more than one active application. In some examples, when a device becomes too hot, or thermally unstable, a notification may suspend active applications and may prompt user interaction to select which application to continue running in the foreground, in order to mitigate the thermal condition for the device.

Some examples provide a user experience that allows for user selection of an application to continue executing in a foreground environment while other active applications may be moved out of the foreground to address thermal device conditions. As a result, these examples improve the functioning of the computing device by increased processing speeds, reduced memory consumption, reduced processor loads, improved operating system resource allocation, and improved performances perceived by the user interacting with the computing device. Such changes may also lead to mitigation of thermal conditions for the device.

Referring now to FIG. 1, an exemplary block diagram illustrates a computing device for thermal hardware mitigation. In the example of FIG. 1, the computing device represents a system for monitoring thermal conditions of the computing device and providing a hardware mitigation user experience to address thermal conditions that may arise when the computing device is in disjoint mode. The computing device represents any device executing instructions (e.g., as application programs, operating system functionality, or both) to implement the operations and functionality associated with the computing device. The computing device may include a mobile computing device or any other portable device. In some examples, the mobile computing device includes a mobile telephone, laptop, tablet, computing pad, netbook, gaming device, wearable device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 4-5).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include mail application programs, web browsers, calendar application programs, address book application programs, messaging programs, communication applications, media applications, location-based services, search programs, productivity applications, and the like. The applications may communicate with counterpart applications or services such as web services accessible via a network. For example, the applications may represent downloaded client-side applications that correspond to server-side services executing in a cloud.

The memory area further stores one or more computer-executable components. Exemplary components include a communications interface component, a user interface component, and a hardware mitigation component. The user interface component, when executed by the processor of the computing device, causes the processor to output data to the user interface component and process user input received via the user interface component.

In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

In some examples, the user interface component may include a graphics card, video capture card, and/or other input/output subsystems for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

Referring again to FIG. 1, an exemplary block diagram illustrates a computing device for providing a hardware mitigation user experience. Computing device 102 may be communicatively coupled to or in communication with device 104. Device 104 may be any suitable device capable of receiving content or data from computing device 102 for display or output. In these examples, computing device 102 may be referred to as a core computing device, a local computing device, or a primary computing device. In these examples, device 104 may include, without limitation, a secondary computing device, a remote computing device, an auxiliary device, a display device, a speaker device, an embedded device, or any other suitable device capable of communicating over any communication medium with computing device 102. As used herein, remote may refer to a computing device or other device that is separate from computing device 102.

Computing device 102 includes processor 106, which may be communicatively coupled to memory area 108. Computing device 102 may also include thermal sensor(s) 110 and display 112. Thermal sensor(s) 110 may be any type of sensors coupled to computing device 102 and configured to capture temperature measurements associated with device hardware. Display 112 may be coupled to user interface component 118 and configured to provide user consumption of content or user interaction capabilities for computing device 102. In other examples, display 112 may be incorporated as part of user interface component 118. In one illustrative example, display 112 represents a display screen of a mobile phone device.

Device 104 may also include display 114, which may be similar to display 112, in these examples. For example, in one illustrative scenario display 114 may be a display screen of a big screen television or monitor. As another illustrative example, device 104 may be a projector configured to project content received from computing device 102 onto display 114.

Memory area 108 may include operating system component 116, user interface component 118, hardware mitigation component 120, application(s) 122, policy 124, communications interface component 126, and application state data 128. Operating system component 116 may be configured to monitor thermal conditions for computing device 102, among other tasks. Operating system component 116 receives thermal data 128 from thermal sensor(s) 110 of computing device 102. Operating system component 116 may include, without limitation, a kernel, stack, monitor, or any other suitable component configured to receive thermal data 128 from thermal sensor(s) 110, in these examples. Thermal data may include, without limitation, thermal measurements, limited information indicating a device is too hot, or detailed information about specific device component(s) that are too hot in a schematized fashion so as to enable the operating system to take more specific actions. Thermal data 128 may be received over intervals of time, according to a schedule or operating system policy, or dynamically as needed based on computing device operations, for example.

In some examples, operating system component 116 has threshold information set by the original equipment manufacturer (OEM) for acceptable thermal conditions. If the thermal data received from the thermal sensors indicate that a thermal conditions reach or exceed the threshold, the operating system component may notify hardware mitigation component 120, such as by generating and sending thermal signals 130. In some other examples, threshold information for determining thermal signals 130 may be defined by the manufacturer of operating system component 116 to establish a common schema over which thermal data are to be interpreted. For example, original equipment manufacturers may provide details on acceptable thermal conditions, while threshold information may be more strictly defined by operating system component 116. In this example, the threshold information may provide thermal conditions according to a strict schema defined by operating system component 116 such that different operating environments provide thermal details in a common and consistent way.

Hardware mitigation component 120 may be incorporated into user interface component 118 in some examples. Hardware mitigation component 120 receives thermal signals 130 from operating system component 116 and determines whether device temperatures for computing device 102 may be addressed via a hardware mitigation user experience. Hardware mitigation component 120 may also access application state data 128 when analyzing thermal signals 130 and determining whether to generate notification 132 to provide a hardware mitigation user experience. Application state data 128 may include data such as, without limitation, whether the application(s) are running in the background or foreground, and if running in the foreground, whether the application(s) are active or non-active. In these examples, a foreground application may be active or non-active. An active application refers to an application that has a user's focus or has the latest user interaction, and a non-active application refers to an application that is in the foreground but does not have the user's focus or the latest user interaction in time. In some examples, hardware mitigation component 120 may apply mitigations immediately if hardware mitigation component 120 determines that such mitigation actions do not require user interaction.

In some examples, computing device 102 may be executing two or more of application(s) 120 in the foreground, projecting at least some application-rendered content to device 104, and causing device hardware of computing device 102 to generate heat that reaches or exceeds a threshold recognized by operating system component 116. In this exemplary scenario, hardware mitigation component 120 determines that computing device 102 is too hot based on thermal signals 130, and generates notification 132 to output via user interface component 118.

Notification 132 may be a user notification that is displayed via user interface component 118 over display 112 and display 114, or over any connected display to which computing device 102 is sending content. Notification 132 may alert a user of thermal conditions associated with computing device 102, and may request user interaction to select a thermal mitigation option for addressing the identified thermal conditions. For example, notification 132 may identify the current applications executing in the foreground and generate a user selection request within notification 132 to prompt a user selection of one application. Following receipt of user input 134 in response to notification 132, hardware mitigation component 120 may take hardware mitigation actions 136. In some examples, hardware mitigation actions 136 may be to allow the selected application to continue running in the foreground, while moving unselected applications out of the foreground. In some other examples, hardware mitigation actions 136 may include notifying an application or applications to take an action, such as pausing media playback for example. Additionally, hardware mitigation actions 136 may include actions directed towards a display associated with the unselected application, such as the display upon which content corresponding to the unselected application is being displayed. In these examples, hardware mitigation actions 136 may include the display associated with the unselected application being turned off, set to a low-power state, sent a static image, sent a black frame, or the like.

In some examples, the unselected applications may be moved to the background, suspended, tombstoned, killed, or otherwise moved out of foreground operations. In one illustrative example, if the unselected application is currently playing media, the action of moving that application out of the foreground may send a signal to the application to pause the media playback at that point, or the application may be notified that a mitigation action is needed and the application may take an appropriate action in response, such as pausing the media playback, for example. As another example, if the unselected application is a video communication application, the action of moving that application out of the foreground may send a signal to the application to switch from a video mode to an audio-only mode. User input 134 may be, for example, a user selection of at least one application to continue executing in the foreground. In other examples, user input 134 may be user selection of one or more applications to move out of the foreground, for examples, with the remaining unselected application being allowed to continue in the foreground.

In one example scenario, a media streaming application executing on computing device 102 may be outputting content to a second screen, such as device 104, as a productivity application executing on computing device 102 is providing content to the device screen, such as display 112. In this example, hardware mitigation component 120 may receive thermal signals indicating computing device 102 is too hot, or thermally unstable. Hardware mitigation component 120 may access or obtain application state data 128 to identify that both the media streaming application and the productivity application are running in the foreground. In this example, hardware mitigation component 120 may generate notification 132 to provide user notification that computing device 102 is too hot and may request user selection of at least one of the foreground applications. The notification may be output via user interface component 118 to both display 112 of computing device 102 and display 114 of device 104, suspending all applications as the notification displays over the application content. User selection of the productivity application received via user input 134 provides for the productivity application to resume running in the foreground while the unselected media streaming applications is moved out of the foreground, in this illustrative example.

Policy 124 may include any number of heuristics, rules, or guidelines for determining thermal conditions or other device conditions that may benefit from hardware mitigation actions 136. Hardware mitigation actions 136 may include any number of actions taken in response to policy 124. This may include actions performed directly by operating system component 116 or requests made of applications 122 to take an action in response to a thermal condition, for example. As one exemplary illustration, policy 124 may include rules for hardware mitigation actions 136 when computing device 102 is in disjoint mode. Hardware mitigation component 120 may use policy 124 when determining whether to provide a hardware mitigation user experience, or for determining a type of hardware mitigation user experience to provide, for example. Communications interface component 126 may be used to establish or maintain, or both establish and maintain, a connection between computing device 102 and device 104, in these examples. In some examples, user interface component 118 may project or stream a user interface of computing device 102 to a display of device 104.

Figure 2:
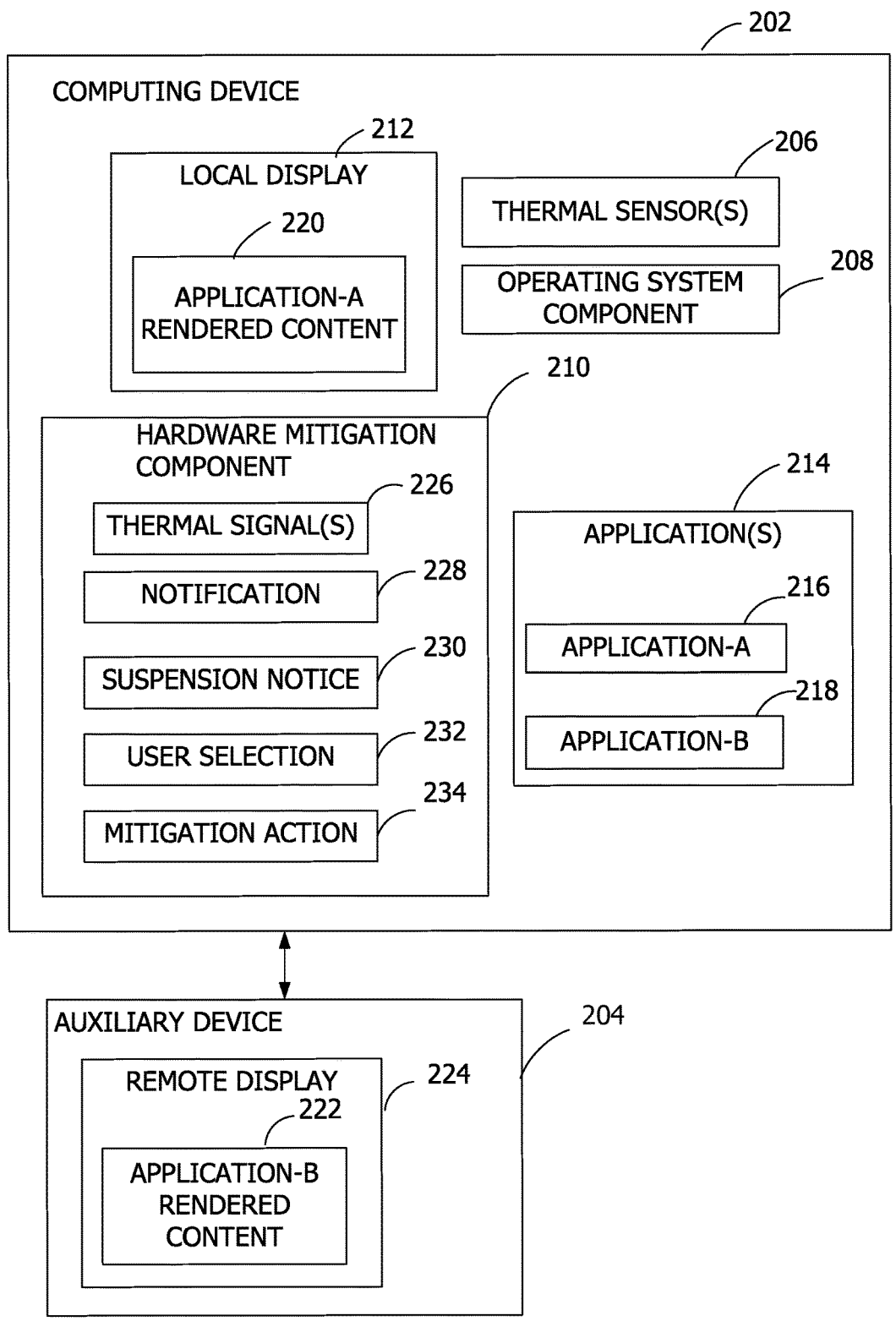
FIG. 2 is an exemplary block diagram illustrating a computing device communicatively coupled to an auxiliary device in disjoint mode.

Referring next to FIG. 2, an exemplary block diagram illustrates a computing device communicatively coupled to an auxiliary device in disjoint mode. Computing device 202 may be any device executing instructions (e.g., as application programs, operating system functionality, or both) to implement the operations and functionality associated with the computing device. In these examples, computing device 202 may include, without limitation, a mobile computing device or any other portable device, a less portable device, or a group of processing units or other computing devices. In some examples, a mobile computing device may include a mobile telephone, laptop, tablet, computing pad, netbook, gaming device, wearable computing device, and/or portable media player. A less portable devices may include desktop personal computers, kiosks, tabletop devices, industrial control devices, wireless charging stations, and electric automobile charging stations, in these examples.

Computing device 202 may be communicatively coupled to or in communication with auxiliary device 204. Auxiliary device 204 may be any suitable device capable of receiving content or data from computing device 202 for display or output. In addition auxiliary device 204 may be enabled to return input back to computing device 202. In these examples, auxiliary device 204 may include, without limitation, a secondary computing device, a remote computing device, a display device, a speaker device, an embedded device, or any other suitable device capable of communicating with computing device 202.

In this exemplary diagram, computing device 202 includes thermal sensor(s) 206, operating system component 208, hardware mitigation component 210, and local display 212. Thermal sensor(s) 206 may be an illustrative example of one implementation of thermal sensor(s) 110 in FIG. 1, for example. Operating system component 208 may be an illustrative example of one implementation of operating system component 116 in FIG. 1, for example. Hardware mitigation component 210 may be an illustrative example of hardware mitigation component 130 in FIG. 1, for example.

Computing device 202 includes application(s) 214, which may be an illustrative example of application(s) 120 in FIG. 1. Computing device 202 executes application(s) 214 and may provide application content via a user interface component of computing device 202. In this illustrative example, application-A 216 and application-B 218 represent two applications executing simultaneously in the foreground environment of computing device 202. In this example, state data for application-A 216 and application-B 218 may indicate that both applications are in the foreground, and that application-A rendered content 220 is being output to local display 212 while application-B rendered content 222 is being output to remote display 224, for example.

In this illustrative example, where application-A 216 and application-B 218 are executing concurrently in the foreground, hardware mitigation component 210 may receive thermal signal(s) 226 from operating system component 208 indicating that thermal conditions for computing device 202 have reached or exceeded a threshold. Hardware mitigation component 210 may generate notification 228 to output to local display 212 and remote display 224, for example. Notification 228 may provide a user notification of the thermal condition identified, such as an indication that computing device 202 is too hot, as well as an indication of thermal hardware mitigation actions that may be taken to address the identified thermal condition. For example, the notification may include an indication that application-A 216 and application-B 218 are both running in the foreground, and request user selection of one application to continue running in the foreground.

Hardware mitigation component 210 may also generate suspension notice 230 concurrently with notification 228, or in addition to notification 228. Suspension notice 230 sends a message to any applications executing in the foreground environment of computing device 202 that the applications are no longer in the foreground, or are suspended from foreground operations. For example, hardware mitigation component 210 may cause a suspension notice 230 to be sent to application-A 216 and application-B 218, in this illustrative scenario, concurrently with sending notification 228 via a user interface of computing device 202 to invite user interaction during the thermal hardware mitigation user experience.

Hardware mitigation component 210 receives user selection 232 via a user interface of computing device 202 in response to notification 228. User selection 232 may be a selection of an application to continue running in the foreground, a selection of an application to move out of the foreground, or any other suitable user selection of provided mitigation options presented in notification 228, for example. Based on user selection 232, hardware mitigation component 210 initiates mitigation action 234. Mitigation action 234 may be, for example, without limitation, allowing an application to resume running in the foreground while moving other applications out of the foreground, or allowing one suspended application to resume running in the foreground while maintaining the foreground suspension for the other applications.

In some examples, rather than simply suspending an application or applications, a signal may be sent to one or more of the active applications running in the foreground requesting that the application(s) limit a particular action or alter the application experience to simplify rendering demands on the computing device. In this example, operating system component 208, hardware mitigation component 210, and application(s) 214 may work together through a common communication model to achieve thermal mitigation, providing a better user experience while addressing thermal hardware requirements. In one illustrative example, notification 228 may provide a user selection option corresponding to particular application actions or experiences capable of being altered to address thermal mitigation, allowing user selection 232 to drive the mitigation action during the thermal hardware mitigation user experience Referring next to FIG. 3, an exemplary block diagram illustrates a notification implemented on a computing device and a connected device in disjoint mode. Mobile device 302 may be an illustrative example of a mobile device, such as a smart phone or tablet, for example. Connected device 304 may be an illustrative example of a second screen, such as a monitor, television, or other display device, for example.

Mobile device 302 may be communicatively coupled to or in communication with connected device 304. Mobile device 302 may provide media application rendered content, such as a streaming cinematic movie for example, for output at connected device 304. While streaming a movie over connected device 304, mobile device 302 may also be executing a gaming application with application-rendered content provided on a display screen of mobile device 302. A hardware mitigation component, such as hardware mitigation component 130 in FIG. 1 for example, may identify that mobile device 302 has become too hot while executing the media application and the gaming application together in the foreground of mobile device 302. The hardware mitigation component may suspend both the media application and the gaming application, pausing content output on both the mobile device screen and the second screen, while displaying notification 306 at both displays, for example.

In this illustrative example, notification 306 displays simultaneously over both displays of the connected devices, and provides a notification that the computing device rendering the content output to both displays is too hot. Notification 306 may request user selection of a mitigation action, such as a selection of an application to continue using in the foreground environment, for example. In other examples, notification 306 may appear on only one display of the connected devices based on heuristics, such as attempting to determine where current user interaction is occurring. User selection may be provided via the user interface of mobile device 302, such as the touch screen display of the mobile phone, for example, by user selection of one of the presented applications displayed within notification 306. If user selection indicates that the gaming application should continue running, the gaming application content may resume while the media application remains suspended, or is otherwise moved out of the foreground, for example. Likewise, if user selection indicates that the media application should continue running, the movie content may resume on the second screen while the gaming application remains suspended, or is otherwise moved out of the foreground, for example.

As another example, the selection presented in notification 306 may present types of mitigation actions related to specific application actions or application experiences, such as switching a video communications application from a video-mode to an audio-only mode to reduce rendering requirements for mobile device 302.

Any number of possible connectivity configurations between devices and mitigation options associated with multiple applications executing on a device may be implemented using the hardware mitigation component. The illustrative examples provided herein are not intended to limit in any way the configuration options or mitigation options provided by the hardware mitigation user experience described herein.

Figure 4:
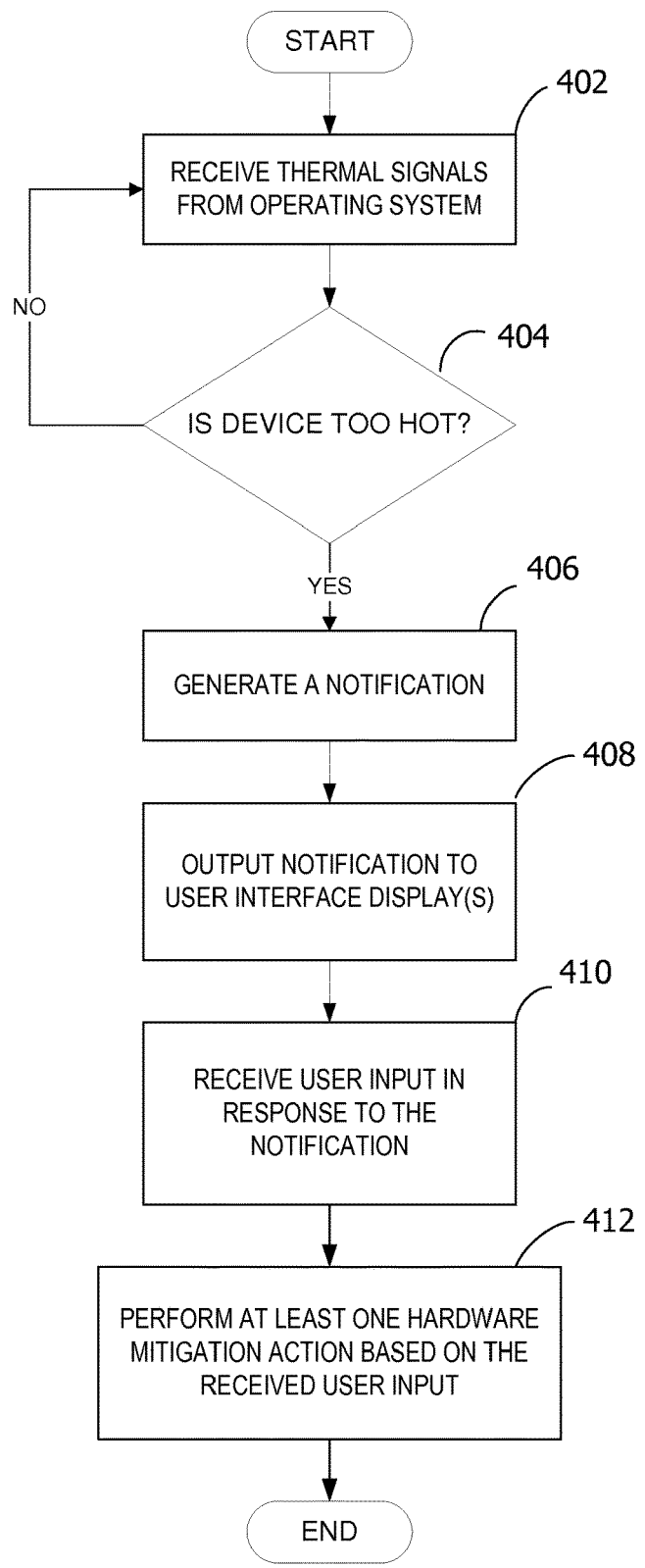
FIG. 4 is an exemplary flowchart illustrating operations performed by the hardware mitigation component implemented on a computing device.

Referring next to FIG. 4, an exemplary flowchart illustrates operations performed by the hardware mitigation component implemented on a computing device. These operations may be performed by a hardware mitigation component, such as hardware mitigation component 130 of FIG. 1 or hardware mitigation component 210 of FIG. 2, for example.

The process begins by receiving thermal signals from a device operating system at operation 402. The device operating system refers to the operating system associated with the device executing applications and providing application-rendered content, whether the content is displayed on the device or another connected device. The process determines whether the device is too hot at operation 404. For example, the thermal signals received from the operating system may indicate that a threshold temperature has been reached for device hardware, requiring hardware mitigation in some exemplary illustrations. In other examples, a policy may indicate that the thermal signals received warrant a hardware mitigation action.

In response to the process determining that the device is not too hot, or that a hardware mitigation action is not warranted, the process returns to operation 402. In response to the process determining that that device is too hot, the process generates a notification at operation 406. The notification may provide a user notification of device conditions as well as request user selection of a mitigation option to address the device conditions, for example.

The process outputs the notification to user interface display(s) at operation 408. In some examples, such as a mobile device in disjoint mode connected to another display device, the notification may be displayed over both device screens and suspend application-rendered content and other user interface operations until user interaction with the notification has been received. In alternate examples, the hardware mitigation component or user interface component may apply heuristics to determine which display device is optimum for presenting the notification experience, and display the notification at the determined optimal display.

The process receives user input in response to the notification at operation 410, and performs at least one hardware mitigation action based on the received user input at operation 412, with the process terminating thereafter. Alternatively, the process may return to operation 402 and continue to receive thermal signals on a schedule, or some other basis.

Figure 5:
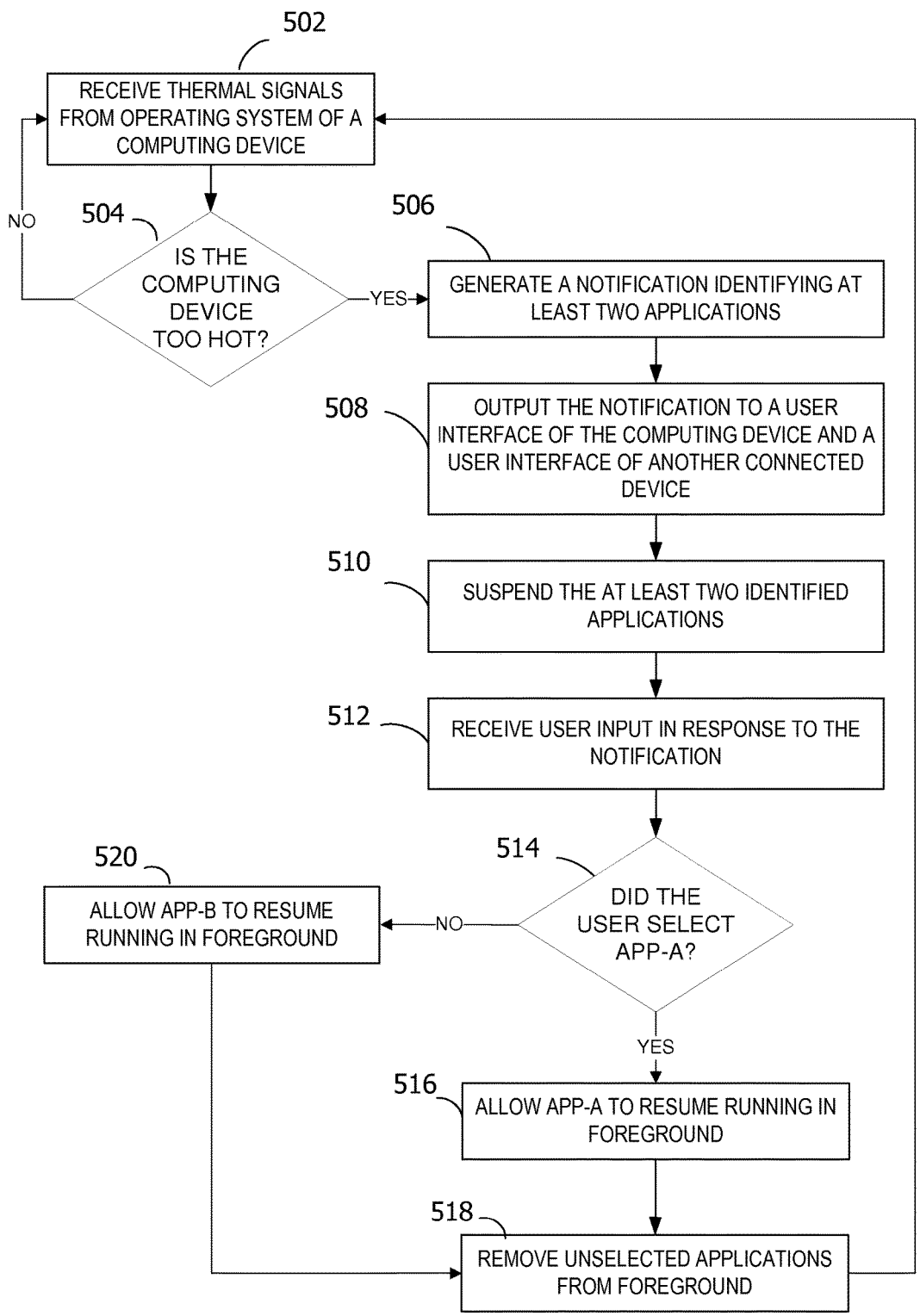
FIG. 5 is an exemplary flowchart illustrating operations performed by the computing device implementing the hardware mitigation component.

Referring next to FIG. 5, an exemplary flowchart illustrates operations performed by the computing device implementing the hardware mitigation component to implement the hardware mitigation action of moving an application out of the foreground. This represents just one of many potential hardware mitigation actions which may or may not require user input in response to a notification, if needed, to perform thermal hardware mitigation. These operations may be performed by a hardware mitigation component, such as hardware mitigation component 130 of FIG. 1 or hardware mitigation component 210 of FIG. 2, for example.

The process begins by receiving thermal signals from an operating system of a computing device at operation 502. The process determines whether the computing device is too hot at operation 504. In response to the process determining that the device is not too hot, or that a hardware mitigation action is not warranted, the process may return to operation 502. In response to the process determining that that device is too hot, the process generates a notification identifying at least two applications at operation 506. The hardware mitigation component may identify the applications based on application state data indicating which applications are running in the foreground and may be contributing to the thermal condition of device hardware, for example.

The process outputs the notification to a user interface of the computing device and a user interface of another connected device at operation 508. In these examples, the computing device may be operating in disjoint mode and connected to another device, such that outputting the notification displays the notification over both device screens. The process suspends the at least two identified applications at operation 510. In addition to the applications identified, other device operations may be suspended as well until user interaction with the notification is received, in some examples.

The process receives user input in response to the notification at operation 512. The user input may be user selection of one of the at least two applications, for example. The process determines whether the user input indicates a user selection of application-A at operation 514. In response to the process determining that the user selected application-A, the process allows application-A to resume running in the foreground at operation 516, and removes unselected applications from the foreground of the computing device at operation 518, optionally returning to operation 502 thereafter.

In response to the process determining that the user did not select application-A, the process allows application-B to resume running in the foreground at operation 520, and proceeds to operation 518 to remove unselected applications from the foreground before optionally returning to operation 502 thereafter.

The exemplary operations presented in FIG. 4 and FIG. 5 are not intended to provide any limitations on the order or manner of steps or operations implemented by a hardware mitigation component. Any number of suitable alternatives may be performed by the hardware mitigation component to address thermal conditions for a computing device. For example, user selection of application-A at operation 514 may prompt the process to allow application-B to resume running in the foreground while application-A is removed from the foreground, for example. It will be appreciated that one skilled in the art may apply the general patterns presented in FIG. 4 and FIG. 5 to any number of hardware mitigation actions, each of which are intended to handle thermal issues In some examples provided herein, a user interface may refer to a display. In some other examples provided herein, a user interface may include or incorporate a display as one component of the user interface. While illustrative examples are provided for two applications running concurrently or simultaneously in the foreground, the methods and operations provided herein may also take into account other scenarios where more than two applications are running in the foreground, for example.

Additional Examples

In some example scenarios, the process described herein may allow the application(s) to determine what action to take upon receiving the thermal mitigation notice, such as notification 132 in FIG. 1, for example. For example, upon receipt of a notification that thermal mitigation action is needed, an application may react to the notification in an appropriate way. For example, a media streaming application may pause content, a multi-media telephone application may continue audio but pause video, a game application may pause content, and so forth according to each specific application. In other examples, the hardware mitigation component may determine the appropriate type of mitigation action for each application to take and send a signal to an application requesting the application pause content or alter an application experience.

In some other examples, the hardware mitigation component may include a timeout mechanism or component, to ensure that a user experience is positive with respect to application-content interruptions. For example, a user may become annoyed with notifications that are too frequent. A positive user experience may be balanced against the thermal hardware conditions of the device to provide a timeout feature that spaces notifications across a specified interval of time, for example.

Alternatively or in addition to the other examples described herein, examples include any combination of the following:
  one or more thermal signals are generated by the operating system based on thermal data received from one or more thermal sensors associated with the computing device;
  transmit the one or more thermal signals to the hardware mitigation component based on a threshold thermal measurement;
  a local display device associated with the computing device;
  a remote display device in communication with the computing device;
  a plurality of applications, including at least two applications running concurrently in the foreground of the computing device, the first application of the at least two applications having first application-rendered content displayed on a display associated with the computing device, and the second application of the at least two applications having second application-rendered content displayed on a display remote from the computing device;
  display the notification over at least one of the first application-rendered content and the second application-rendered content;
  the notification requests user selection of the at least one hardware mitigation action;
  identify a threshold thermal measurement;
  compare the thermal data from the one or more thermal sensors to the threshold thermal measurement;
  determine whether to generate the one or more thermal signals for transmission to the hardware mitigation component;
  a plurality of applications, including at least two applications running concurrently in the foreground, the first application of the at least two applications having first application-rendered content displayed on the local display, and the second application of the at least two applications having second application-rendered content displayed on the remote display;
  suspend at least one of the first application and the second application;
  display the notification over at least one of the first application-rendered content and the second application-rendered content, the notification prompting user selection of the at least one hardware mitigation action;
  wherein the one or more thermal signals are generated by the operating system component based on one or more temperature measurements received from one or more thermal sensors associated with the computing device;
  transmits the one or more thermal signals to the hardware mitigation component based on at least one of a threshold or a policy;
  concurrently rendering at least two different views of an active application running in the foreground of the computing device, including first view application-rendered content displayed on a local display associated with the computing device, and second view application-rendered content displayed on a display remote from the computing device;
  displaying the notification over at least one of the first view application-rendered content and the second view application-rendered content based at least in part on current user interaction;
  suspending at least part of the active application's actions;

receiving additional thermal signals from the operating system;

responsive to a timeout period ending, generating another notification based on the additional thermal signals.

At least a portion of the functionality of the various elements in FIG. 2 may be performed by other elements in FIG. 1, or an entity (e.g., processor, web service, server, application program, computing device, etc.) not shown in FIG. 1.

In some examples, the operations illustrated in FIG. 4-5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to application data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 3:
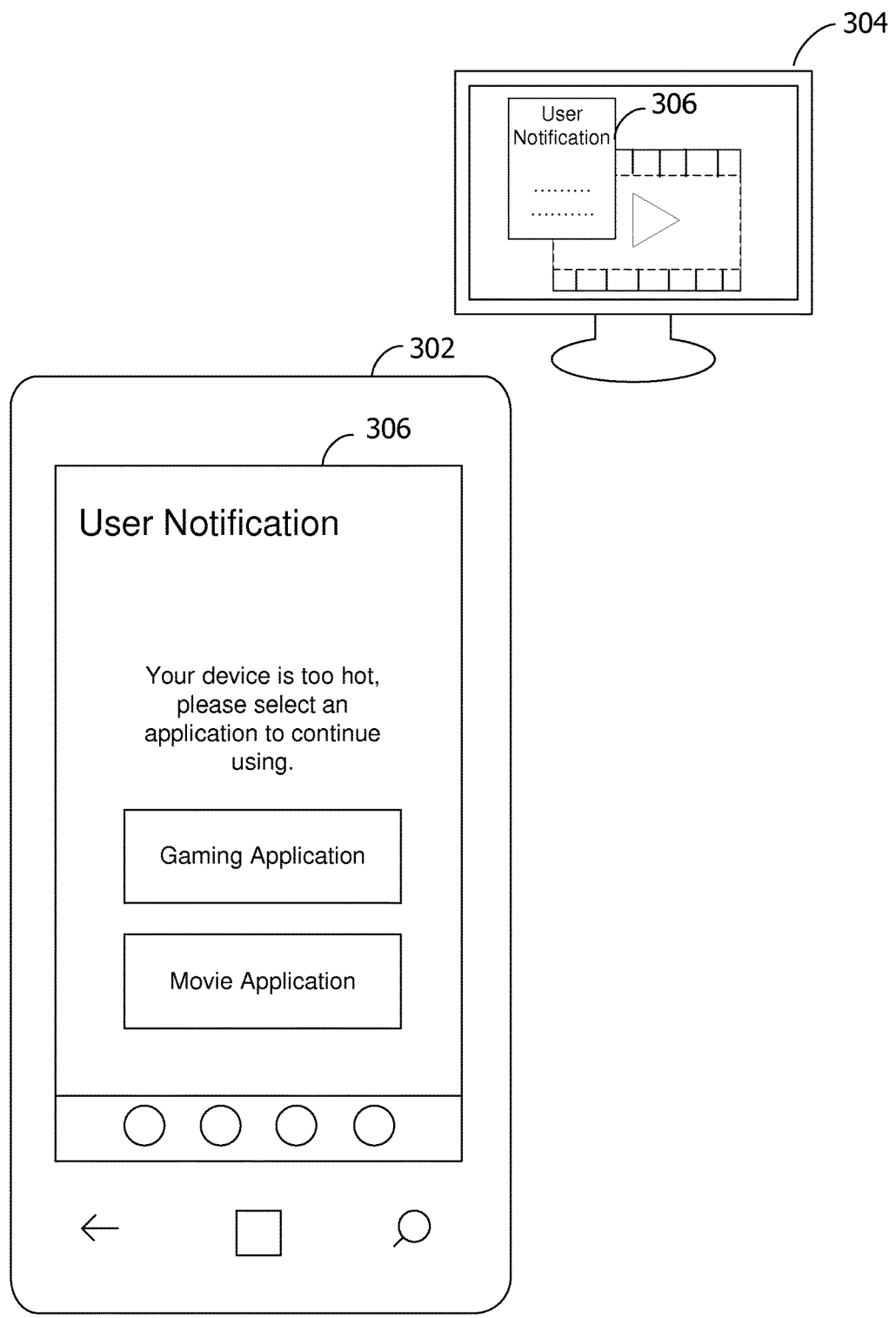
FIG. 3 is an exemplary block diagram illustrating a notification implemented on a computing device and a connected device in disjoint mode.
Figure 6:
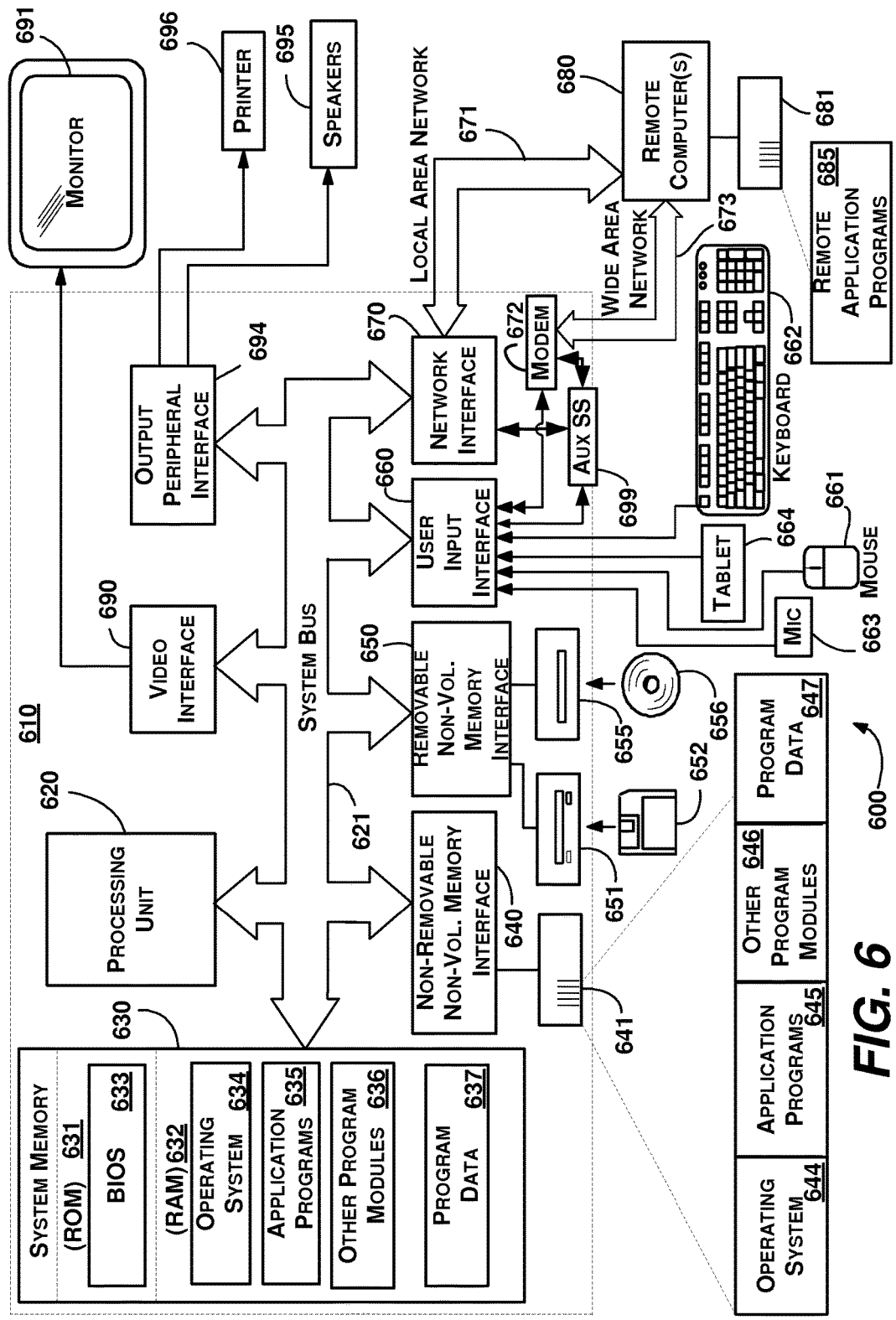
FIG. 6 is an exemplary block diagram illustrating an operating environment for a computing device implementing an audio routing component.

FIG. 6 illustrates an example of a suitable computing and networking environment 600 on which the examples of FIGS. 1-3 may be implemented. The computing system environment 600 is only one example of a suitable computing environment and is not intended to suggest any limitation as to the scope of use or functionality of the disclosure. Neither should the computing environment 600 be interpreted as having any dependency or requirement relating to any one or combination of components illustrated in the exemplary operating environment 600.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the disclosure may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 631 and 632 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 610. Computer storage media does not, however, include propagated signals. Rather, compute storage media excludes propagated signals. Any such computer storage media may be part of computer 610.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components may either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel may be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

The examples illustrated and described herein as well as examples not specifically described herein but within the scope of aspects of the disclosure constitute exemplary means for crafting a response based on targeted sentiment identification. For example, the elements illustrated in FIG. 1-3, such as when encoded to perform the operations illustrated in FIG. 4-5, constitute exemplary means for determining state data for applications, exemplary means for determining content output locations associated with the applications, and exemplary means for routing received audio signals associated with the applications to appropriate audio endpoints associated with the content output locations in order to facilitate smart audio routing management.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for thermal hardware mitigation, the method comprising:
   obtaining, by an operating system component coupled to a computing device, thermal data from one or more thermal sensors associated with the computing device;
   generating one or more thermal signals based on the obtained thermal data;
   generating a notification based on the one or more generated thermal signals;
   outputting the generated notification to a display;
   receiving user input in response to the output notification; and
   performing at least one hardware mitigation action relative to the computing device based on the received user input, wherein the thermal data includes at least one of one or more temperature measurements, information indicating a device is over a threshold temperature, or component data indicating one or more device components are above a threshold temperature.

2. The method of claim 1, wherein generating the notification based on the one or more generated thermal signals further comprises:
   determining whether the one or more generated thermal signals are within an original equipment manufacturer (OEM) threshold;
   responsive to a determination that the one or more generated thermal signals are within the OEM threshold, determining whether the one or more generated thermal signals are within an operating system defined threshold; and
   responsive to a determination that the one or more generated thermal signals are not within the operating system defined threshold, generating the notification.

3. The method of claim 1, further comprising:
   generating additional thermal signals based on additional temperature measurements obtained from the one or more thermal sensors; and
   responsive to a timeout period ending, generating another notification based on the additional thermal signals.

4. The method of claim 1, further comprising:
   generating additional thermal signals based on additional temperature measurements obtained from the one or more thermal sensors; and
   responsive to a timeout period ending, generating another notification based on the additional thermal signals.

5. The method of claim 1, wherein the operating system component transmits the one or more thermal signals to a hardware mitigation component based on at least one of a threshold or a policy.

6. The method of claim 1, further comprising:
   concurrently rendering at least two different views of an active application running in the foreground of the computing device, including first view application-rendered content displayed on a local display associated with the computing device, and second view application-rendered content displayed on a display remote from the computing device.

7. The method of claim 6, further comprising:
   displaying the notification over at least one of the first view application-rendered content and the second view application-rendered content based at least in part on current user interaction.

8. The method of claim 6, further comprising:
   suspending at least part of the active application's actions.

9. One or more computer-readable media comprising executable instructions for thermal hardware mitigation that, upon execution by a computer, cause the computer to perform operations comprising:
   obtaining, by an operating system component coupled to a computing device, thermal data from one or more thermal sensors associated with the computing device;
   generating one or more thermal signals based on the obtained thermal data;
   generating a notification based on the one or more generated thermal signals;
   outputting the generated notification to a display;
   receiving user input in response to the output notification; and
   performing at least one hardware mitigation action relative to the computing device based on the received user input, wherein the thermal data includes at least one of one or more temperature measurements, information indicating a device is over a threshold temperature, or component data indicating one or more device components are above a threshold temperature.

10. The one or more computer-readable media of claim 9, further comprising:
    concurrently rendering at least two different views of an active application running in the foreground of the computing device, including first view application-rendered content displayed on a local display associated with the computing device, and second view application-rendered content displayed on a display remote from the computing device.

11. The one or more computer-readable media of claim 10, further comprising:
    displaying the notification over at least one of the first view application-rendered content and the second view application-rendered content based at least in part on current user interaction.

12. The one or more computer-readable media of claim 10, further comprising:
    suspending at least part of the active application's actions.

13. A system for thermal hardware mitigation, the system comprising:
    an operating system component implemented on a computing device, that obtains thermal data from one or more thermal sensors implemented on the computing device and generates one or more thermal signals based on the obtained thermal data;
    a hardware mitigation component communicatively coupled to the operating system component that:
      obtains the one or more thermal signals from the operating system component;
      generates a notification based on the one or more thermal signals;
      outputs the notification to a display;
      receives user input in response to the notification; and
      performs at least one hardware mitigation action based on the received user input, wherein the thermal data includes at least one of one or more temperature measurements, information indicating a device is over a threshold temperature, or component data indicating one or more device components are above a threshold temperature.

14. The system of claim 13, wherein the operating system component is further configured to:
    transmit the one or more thermal signals to the hardware mitigation component based on a threshold thermal measurement.

15. The system of claim 13, further comprising:
a local display device associated with the computing device; and
a remote display device in communication with the computing device.

16. The system of claim 13, wherein the computing device is operating in a disjoint mode.

17. The system of claim 13, wherein the computing device further comprises:
a plurality of applications, including at least two applications running concurrently in the foreground of the computing device, the first application of the at least two applications having first application-rendered content displayed on a display associated with the computing device, and the second application of the at least two applications having second application-rendered content displayed on a display remote from the computing device.

18. The system of claim 17, wherein the hardware mitigation component is further configured to:
display the notification over at least one of the first application-rendered content and the second application-rendered content.

19. The system of claim 17, wherein the notification requests user selection of the at least one hardware mitigation action.

* * * * *